June 27, 1967  R. B. SCHULZ  3,328,509
APPARATUS FOR SHIELDING AGAINST LOW-FREQUENCY
ELECTROMAGNETIC ENERGY
Filed July 20, 1966
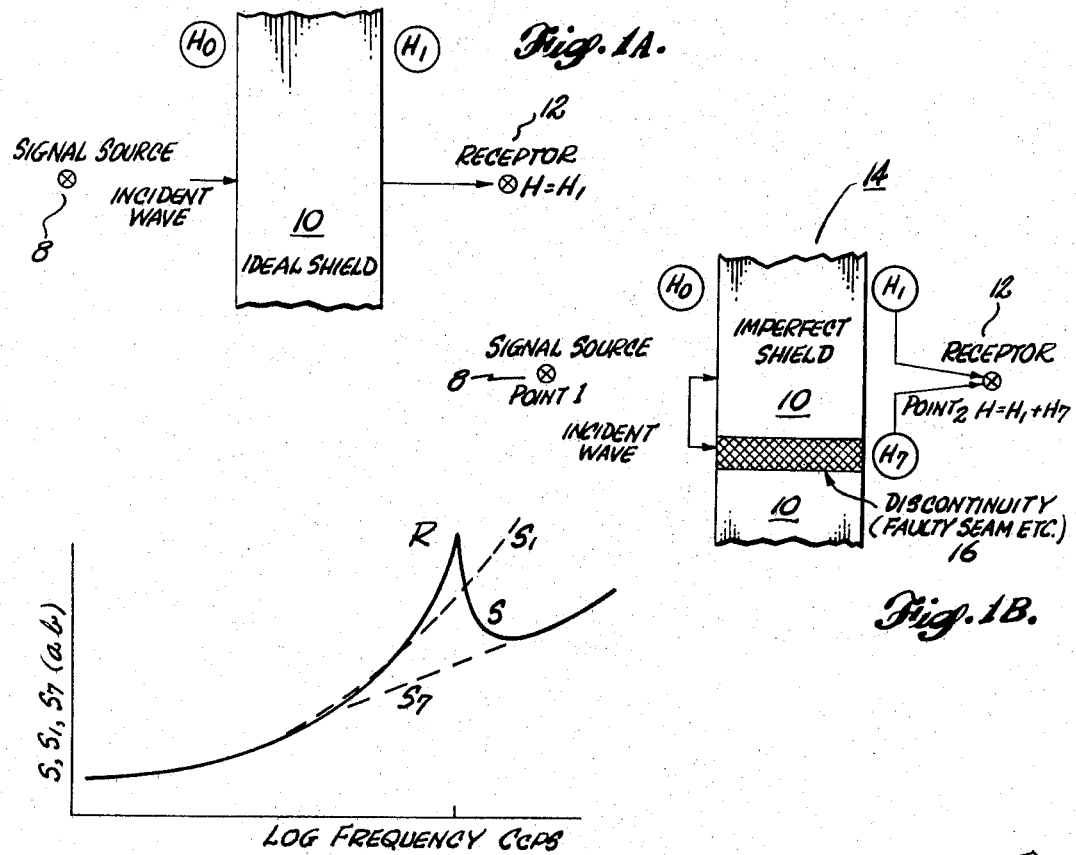
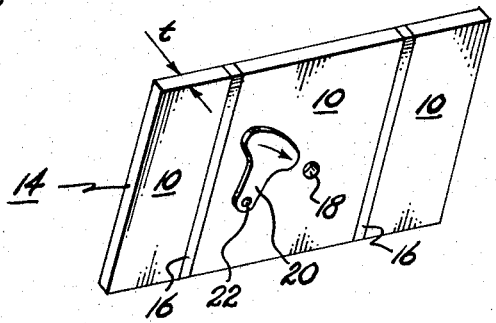
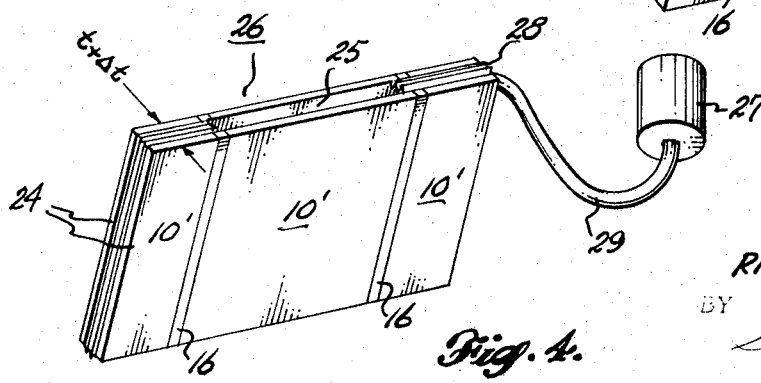
INVENTOR.
RICHARD B. SCHULZ
BY
ATTORNEY

United States Patent Office

3,328,509
Patented June 27, 1967

1

3,328,509
APPARATUS FOR SHIELDING AGAINST LOW-FREQUENCY ELECTROMAGNETIC ENERGY
Richard B. Schulz, Bellevue, Wash., assignor to The Boeing Company, Seattle, Wash., a corporation of Delaware
Filed July 20, 1966, Ser. No. 566,683
2 Claims. (Cl. 174—35)

ABSTRACT OF THE DISCLOSURE

An electromagnetic shield device providing for attenuation of electromagnetic energy which impinges upon the device. At least one air gap or opening is formed through at least one of a number of metal sheets which are joined to form, in part, the electromagnetic shield. A metal member is disposed so as to pivot about a point and to vary, in ordinary shutter fashion, the diameter of the gap or opening. In this manner the amount of flux leakage through the metal sheets can be balanced in amplitude with the flux leakage through the air gap. The electrical properties of the metal sheets is chosen such that the phase lag of the flux passing through the metal sheets will be 180 degrees out of phase with the flux passing through the air gap. Cancellation of flux is thus achieved.

---

Energy having low-frequency resonance in the 5 to 200 kc. range often exists in typical electromagnetic shielding enclosures. This resonance is due to unequal phase shifts or retardation in energy wave transmisison to a receiving point within the shielding enclosure via two or more parallel energy transmission or leakage paths: one path being through the shielding material itself and other paths being leakage paths such as weld seams.

It is obvious that electromagnetic shields occupy a definite portion of the space within typical energy receiver or transmitter units. If the unit dimensions are restricted, as is the tendency in modern design requirements, such shields may interfere with proper positioning of the unit chassis, power supply and receiver elements.

Because of the fact that modern receiver and transmiter units are, preferably, of small dimensions and because of the fact that they are extremely sensitive and must be extremely selective, adequate shielding must be provided within designed space and weight requirements. Such sielding materials necessarily increase the bulk and weight of modern electronic units.

Accordingly, it is an object of the instant invention to provide means, for eliminating electromagnetic energy at a receiver or transmitter, that shall occupy minimum space.

Another object of the instant invention is to provide means, for eliminating electromagnetic energy at a receiver or transmitter, that shall be of minimum weight.

A further object of the instant invention is to provide means for substantially eliminating electromagnetic energy at a single low frequency of electromagnetic frequency.

In the drawings, FIG. 1A represents a cross-sectional view of an ideal eletcromagnetic shield.

2

FIG. 1B represents a cross-sectional view of an electromagnetic shield having typical discontinuities required by construction.

FIG. 2 is a graph showing typical curves of shielding effectiveness versus the logarithm wave frequency of electromagnetic energy.

FIG. 3 represents an embodiment of a shielding filter according to the teachings of this invention.

FIG. 4 represents another embodiment of a shielding filter according to the teachings of this invention.

Referring to FIG. 1A, an ideal electromagnetic shielding barrier consists of an uninterrupted metallic sheet 10 interposed between a signal source 8 and the region to be shielded, for example, a receptor 12. Electromagnetic energy from the source 8, incident upon the sheet or barrier 10, penetrates through barrier 10 from left to right as shown in attenuated fashion due to the cancelling effect of electric currents induced in the barrier 10 by the incident energy. The accepted measure of performance or attenuation of the barrier 10 is commonly termed the shielding effectiveness, which, for the ideal barrier 10 of FIG. 1A, is designated by the symbol $S_1$. Shielding effectiveness $S_1$ can be defined mathematically by the expression:

$$S_1 = 20 \log \frac{|H_0|}{|H_1|} \qquad \text{Eq. 1}$$

and measured by the quantity of electromagnetic energy "decibels" which is a logarithmic ratio of the above symbols $H_0$, $H_1$. $H_0$ represents the magnetic field strength of the energy incident upon the ideal barrier 10 and $H_1$ the magnetic field strength of the attenuated energy which has penetrated through the ideal barrier 10 to the receptor 12. The signal level at the receptor 12 is produced solely by the phasor field, $H_1$ which is represented mathematically as $|H_1|e^{j\theta_1}$.

In practice, as the FIG. 1B represents, an uninterrupted metallic member or plate 10 as shown in FIG. 1A is not practicable as an energy barrier. Rather than having an ideally continuous metallic member or plate 10, a composite apparatus or barrier 14 of FIG. 1B is constructed comprising a first means 10 which forms a first portion of apparatus 14. The first means 10 includes at least two metallic members or plates 10 (three members 10 being shown in FIGS. 3 and 4) which are joined or interconnected by a second means 16, viz, weld seam 16, which forms in part a second portion of apparatus 14. Because the energy from source 8 will impinge upon these imperfections (i.e., weld seams 16) as well as the plates 10, additional penetration of the barrier 14 will occur due to leakage paths along the seams 16. Such penetration of the shielding barrier 14 along these leakage paths can be considered to be in parallel with the ideal transmission through the metallic plates 10. Shielding effectiveness along these discontinuous seam 16 leakage paths, designated for convenience by the symbol $S_7$ can be defined mathematically by the expression:

$$S_7 = 20 \log \frac{|H_0|}{|H_7|} \qquad \text{Eq. 2}$$

where $H_7$ represents the magnetic field strength of the attenuated energy which has penetrated the barrier 14 along the seam 16 imperfections of the otherwise ideal barrier or metallic plates 10. Again in terms of phasor notation, $H_7$ is represented as $|H_7|e^{j\theta_7}$.

The total field H at receptor 12 in FIG. 1B equals $H_1+H_7$. By mathematically combining Equations 1 and 2, we have an expression for the over-all shielding effectiveness S of the barrier 14 as follows:

$$S = 20 \log \frac{|H_0|}{|H_1+H_7|} \quad \text{Eq. 3}$$

Using phasor notation, Eq. 3 is:

$$S = 20 \log \frac{|H_0|}{|H_1|e^{j\theta_1}+|H_7|e^{j\theta_7}} \quad \text{Eq. 4}$$

$\theta_1$ and $\theta_7$ are the phase angles respectively of $H_1$ and $H_7$ with respect to $H_0$.

Developing further, Eq. 4 can be expressed as:

$$S = 10 \log \frac{|H_0|^2}{(|H_1|\cos\theta_1+|H_7|\cos\theta_7)^2+(|H_1|\sin\theta_1+|H_7|\sin\theta_7)^2}$$

and on rearrangement:

$$S = -10 \log \frac{|H_1|^2+|H_7|^2+2|H_1||H_7|\cos(\theta_1-\theta_7)}{|H_0|^2}$$

The ratio $$\frac{|H_p|}{|H_0|} = 10^{-\frac{Sp}{20}}$$

gives us the final relationship:

$$S = -10 \log \left[ 10^{-\frac{S_1}{10}} + 10^{-\frac{S_7}{10}} + 2\times 10^{-\frac{S_1+S_7}{20}} \cos(\theta_1-\theta_7) \right]$$

Eq. 5

Referring to FIG. 2, typical curves of S, $S_1$ and $S_7$ are plotted for a high permeability material such as steel. Such a steel forms the metal member or plate 10 portion of barrier 14 in FIG. 1B. A resonance peak is closely defined in FIG. 2 by the reference letter R and, according to the teachings of this invention, may be changed by variations in the parameters $S_1$, $S_7$ and $_1\theta_7 = \theta_1 - \theta_7$.

Referring to FIG. 3, an embodiment of the teachings of this invention is depicted. Apparatus or barrier 14, comprising members or plates of a suitable metal (e.g., copper, aluminum, steel, steel aluminum plated, or steel galvanealed) of thickness $t$ and weld seams 16 of any suitable metal is shown including an opening 18 which is defined by metal members 10 and which extends through the first portion of barrier 14, i.e., first means 10. A means or movable metallic member 20 of thickness $t$ forms in part said second portion of apparatus 14 and is disposed in combination with said first portion of apparatus 14 by any convenient means (not shown). The member 20 pivots about a point 22 so as to vary the diameter of opening 18 in ordinary shutter fashion. Thus, by variation of the size of opening 18, which essentially constitutes an additional leakage path through barrier 14, the amplitude of the energy passing through opening 18 likewise can be varied. Energy which passes through opening 18 will encounter only air; in the low frequency range for electromagnetic energy, the phase angle $\theta_7$ of the energy field $H_7$ which passes through opening 18 approximates zero since with transmission through air essentially no phase lag exists relative to the phase lag $\theta_1$, existing with passage of energy through metal members 10. Energy transmission through variable opening 18 is an addition to any transmission through seams 16 and effectively, because of the relatively low impedance of air in opening 18 as compared to the relatively higher impedance of seams 16, controls the amplitude of such transmission. Thus $_1\theta_7$ is dependent only upon $\theta_1$ which in turn depends upon electrical properties of metal members 10 and is also approximately proportional to the product of metal members 10 thickness $t$ and the square root of the energy frequency (e.g., as frequency increases 4 times the phase lag $\theta_1$ magnitude doubles).

Referring to Equations 1 and 2, it is clear that the higher the amplitude of the magnetic field $H_1$ in FIG. 1A at receptor 12, and $H_1$ and $H_7$ at receptor 12 in FIG. 1B, the lower is the shielding effectiveness $S_1$ and $S_7$. In order to have maximum over-all efficiency S at the receptor 12, Equation 5 establishes that $S_7$ should equal the value of $S_1$ and $_1\theta_7$ should be 180°. In other words, as seen with reference to FIG. 1B, the amplitude of energy $H_1$ penetrating the metal plates 10 of barrier 14 and the amplitude of energy leakage $H_7$ through the seams 16 should be balanced and the phase lag difference $_1\theta_7$ made to equal 180° so that $H_7$ and $H_1$ will cancel. If $H_7$ and $H_1$ are thus balanced, $S_7$ will necessarily equal $S_1$ and maximum S will be realized. According to the teachings of this invention, and referring again to FIG. 3, the use of opening 18 effectively maintains $\theta_7$ at zero in the low frequency energy range. The phase lag difference $_1\theta_7$, to reiterate, is now dependent only upon $\theta_1$ and is made to equal 180° as energy passes through barrier 14 by proper selection of metal members 10 having certain predetermined electrical properties and thickness $t$. Having pre-established these parameters, $\theta_1$ will be proportional to the product of plate 10 thickness and the square root of energy frequency. Additionally, the amplitude of the leakage field $H_7$ is controlled by the size of opening 18 and when the amplitude of $H_7$ is adjusted by varying the size of opening 18 with member 20 into balance with $H_1$, shielding effectiveness S is maximized, in accordance with Equation 5.

Referring to FIG. 4, another embodiment of the instant invention is provided. At least two substantially parallel composite metallic plates or members 24 form, in part, apparatus or shield 26 whose thickness $t+\Delta t$, as discussed below, is variable. The members 24 are formed by a first means 10 which forms a first portion of apparatus 26. The first means 10' includes at least two metallic members 10' (three members 10' being shown in FIG. 4) which are joined or interconnected by a second means 16, which forms in part a second portion of apparatus 26, viz, weld seams 16. The members 24, supported by means not shown, are variably disposed with respect to distance from one another. An interspace 25, enclosed by a means 28 in combination with said first portion and forming in part said second portion, e.g., a flexible bellows, can be filled with a metallic fluid from a container means 27, e.g., reservoir 27 which also forms in part said second portion and which is connected to interspace 25 by conduit 29. The volume enclosed by flexible means 28 is dependent upon the distance separating the barriers 24. The effective thickness of shield 26 also is dependent upon this separation distance once interspace 25 is filled with metal from means 27. Interspace 25 might also be expanded and filled with a compressible metal such as a resilient metallic wool.

In operation, variation of the thickness $t+\Delta t$ of shield 26 provides the basis of the shielding effectiveness of the embodiment of FIG. 4. The thickness variation imposed upon shield 26 maintains control over and balances the amplitude of the leakage energy field $H_7$ (i.e., energy passing through shield 26 along weld seam discontinuities 16) with respect to the amplitude of the energy field $H_1$ which passes through members 10 of shield 26.

As discussed hereinbefore, $_1\theta_7$ is dependent upon: (1) electrical properties of the metal comprising a shield barrier such as shield 26; and, (2) the product of shield 26 material thickness and the square root of energy frequency. Since the thickness of shield 26 controls the phase lag of energy passing through shield 26, the above parameters are controlled by the embodiment of FIG. 4. Although $\theta_7$ will not be zero in the instant embodiment, $_1\theta_7$ will be made to approach 180 degrees by selectively adjusting the thickness $t+\Delta t$ of shield 26 in view of the shield 26 electrical properties which are established as soon as metals are selected to form shield 26. $\theta_7$ is directly proportional to over-all thickness, $t+\Delta t$, of shield 26; $H_7$ is related to over-all thickness of shield 26 in a much more complicated fashion. The two quantities $\theta_7$ and $H_7$ are thus interrelated and are adjusted from experimental considerations as applied to varying $t+\Delta t$ of shield 26. To summarize, shielding effectiveness S is maximized when $_1\theta_7$ equals 180 degrees and the amplitudes of $H_1$ and $H_7$ are equal.

Since numerous changes may be made in the above apparatus and different embodiments may be made without departing from the spirit thereof, it is intended that all matter contained in the foregoing description or shown in the accompanying drawings shall be interpreted as illustrative and not in a limiting sense.

What is claimed is:

1. In apparatus for attenuating electromagnetic energy by maximizing electromagnetic shielding effectiveness, S, defined by the equation:

$$S = -10 \log \left[ 10^{-\frac{S_1}{10}} + 10^{-\frac{S_7}{10}} + 2 \times 10^{-\frac{S_1+S_7}{20}} \cos(\theta_1-\theta_7) \right]$$

wherein $S_1$ is the shielding effectiveness of a first portion of said apparatus and is defined by the equation:

$$S_1 = 20 \log \frac{|H_0|}{|H_1|}$$

of which $|H_0|$ represents the magnetic field strength of electromagnetic energy impinging upon said apparatus and $|H_1|$ represents the magnetic field strength of electromagnetic energy attenuated in passing through said first portion of said apparatus, and wherein $S_7$ is the shielding effectiveness of a second portion of said apparatus and is defined by the equation:

$$S_7 = 20 \log \frac{|H_0|}{|H_7|}$$

of which $|H_0|$ remains as defined above and $|H_7|$ represents the magnetic field strength of electromagnetic energy attenuated in passing through said second portion of said apparatus, means for controlling $S_1$, $S_7$, $\theta_1$ which represents the phase angle of $|H_1|$ and $\theta_7$ which represents the phase angle of $|H_7|$, comprising:

(a) at least two metallic members forming said first portion and defining an opening through said first portion;
(b) means forming in part said second portion and serving to interconnect said at least two metallic members; and
(c) a movable member forming in part said second portion and disposed, for cooperation with the opening defined by said at least two metallic members, to pivot about a point at a surface of said first portion so as to vary the diameter of the opening defined by said at least two metallic members so that on adjustment of said movable member the absolute values of $|H_7|$ and $|H_1|$ are substantially equal and the relationship $(\theta_1-\theta_7)$ equal to 180 degrees.

2. In apparatus for attenuating electromagnetic energy by maximizing electromagnetic shielding effectiveness, S, defined by the equation:

$$S = -10 \log \left[ 10^{-\frac{S_1}{10}} + 10^{-\frac{S_7}{10}} + 2 \times 10^{-\frac{S_1+S_7}{20}} \cos(\theta_1-\theta_7) \right]$$

wherein $S_1$ is the shielding effectiveness of a first portion of said apparatus and is defined by the equation:

$$S_1 = 20 \log \frac{|H_0|}{|H_1|}$$

of which $|H_0|$ represents the magnetic field strength of electromagnetic energy impinging upon said apparatus and $|H_1|$ represents the magnetic field strength of electromagnetic energy attenuated in passing through said first portion of said apparatus, and wherein $S_7$ is the shielding effectiveness of a second portion of said apparatus and is defined by the equation:

$$S_7 = 20 \log \frac{|H_0|}{|H_7|}$$

of which $|H_0|$ remains as defined above and $|H_7|$ represents the magnetic field strength of electromagnetic energy attenuated in passing through said second portion of said apparatus, means for controlling $S_1$, $S_7$, $\theta_1$ which represents the phase angle of $|H_1|$ and $\theta_7$ which represents the phase angle of $|H_7|$, comprising:

(a) a movable member forming in part said second portion and disposed, for cooperation with an opening defined by said first portion, to pivot about a point at a surface of said first portion so as to vary the diameter of the opening defined by said said first portion until the absolute values of $|H_7|$ and $|H_1|$ are substantially equal;
(b) at least two metallic members forming said first portion and defining the opening through said first portion, said metallic members having certain predetermined electrical properties and thickness $t$ so that $\theta_1$ is 180 degrees out of phase with $\theta_7$; and
(c) means forming in part said second portion and serving to interconnect said at least two metallic members.

References Cited

UNITED STATES PATENTS

| | | | |
|---|---|---|---|
| 2,293,839 | 8/1942 | Linder | 174—35 X |
| 2,594,971 | 4/1952 | Moullin. | |
| 3,236,935 | 2/1966 | Patton | 174—35 |

LEWIS H. MYERS, *Primary Examiner.*

D. L. CLAY, *Examiner.*